(12) United States Patent
Maestas

(10) Patent No.: US 10,524,480 B2
(45) Date of Patent: Jan. 7, 2020

(54) METHOD AND SYSTEM FOR HUMANELY DISPATCHING WOUNDED GAME

(71) Applicant: David Maestas, Los Lunas, NM (US)

(72) Inventor: David Maestas, Los Lunas, NM (US)

(*) Notice: Subject to any disclaimer, the term of this patent is extended or adjusted under 35 U.S.C. 154(b) by 423 days.

(21) Appl. No.: 15/424,286

(22) Filed: Feb. 3, 2017

(65) Prior Publication Data
US 2017/0142983 A1 May 25, 2017

Related U.S. Application Data

(60) Continuation-in-part of application No. 15/139,417, filed on Apr. 27, 2016, now Pat. No. 9,585,404, which is a division of application No. 14/060,359, filed on Oct. 22, 2013, now Pat. No. 9,374,994.

(51) Int. Cl.
| | | |
|---|---|---|
| *A22B 3/00* | (2006.01) | |
| *A22B 3/10* | (2006.01) | |
| *A22B 3/08* | (2006.01) | |
| *F41A 21/40* | (2006.01) | |
| *B25B 13/50* | (2006.01) | |
| *A01M 31/00* | (2006.01) | |

(52) U.S. Cl.
CPC ............... *A22B 3/10* (2013.01); *A22B 3/08* (2013.01); *B25B 13/5083* (2013.01); *F41A 21/40* (2013.01); *A01M 31/00* (2013.01)

(58) Field of Classification Search
CPC .......... F41A 35/00; F41A 29/02; F41C 21/40; F41C 21/32; F41C 21/325; F41C 21/36; A22C 21/00; A22C 21/0092

USPC .............. 42/76.01, 79, 90, 92, 95, 106–108; 89/14.05–14.6; 452/128

See application file for complete search history.

(56) References Cited

U.S. PATENT DOCUMENTS

| | | |
|---|---|---|
| 1,503,372 A | 7/1924 | Pacholke |
| 1,580,790 A | 4/1926 | MacAllister |
| 2,081,229 A | 5/1937 | Fisher et al. |
| 2,434,587 A | 1/1948 | Riordan |
| 3,991,466 A | 11/1976 | Smith |
| 4,127,919 A | 12/1978 | Buddecke |
| 4,551,886 A | 11/1985 | Couche et al. |
| 4,553,287 A | 11/1985 | DeSordi et al. |
| 4,601,102 A | 7/1986 | Philips |
| 5,290,186 A | 3/1994 | Juranitch |
| 5,613,904 A | 3/1997 | LaSalle et al. |
| 6,183,356 B1 | 2/2001 | Middleton et al. |
| 6,450,871 B1 | 9/2002 | Morrison, Jr. et al. |
| 7,024,777 B1 | 4/2006 | Bach |
| 7,125,329 B2 | 10/2006 | Mindes |
| 7,402,099 B1 | 7/2008 | Parvin |
| 7,578,731 B1 | 8/2009 | Moore |
| 8,308,534 B1 | 11/2012 | Amesbury |
| 2013/0023190 A1 | 1/2013 | Evans |
| 2013/0192005 A1* | 8/2013 | Christenson ............ B25F 1/006 7/138 |

\* cited by examiner

*Primary Examiner* — Richard T Price, Jr.
(74) *Attorney, Agent, or Firm* — Loza & Loza LLP; Kevin L. Soules

(57) ABSTRACT

A method, system, and apparatus for humanely dispatching wounded game in the field comprises a shank with a connecting end, a curved region, and a pointed end connected to a grip formed at the connecting end of the shank, and a finger loop. The grip can further comprise a series or flattened portions configured to engage the gaps in a choke tube in order to remove the choke tube.

6 Claims, 10 Drawing Sheets

METHOD AND SYSTEM FOR HUMANELY DISPATCHING WOUNDED GAME

CROSS-REFERENCE TO PROVISIONAL APPLICATION

This application is a Continuation in Part of U.S. application Ser. No. 15/139,417, entitled "Method and System for Humanely Dispatching Wounded Game," filed on Apr. 27, 2016. Application Ser. No. 15/139,417 is incorporated herein by reference in its entirety.

Application Ser. No. 15/139,417 is a divisional of U.S. application Ser. No. 14/060,359, entitled "Method and System for Humanely Dispatching Wounded Game," filed on Oct. 22, 2013. Application Ser. No. 14/060,359 is incorporated herein by reference in its entirety.

TECHNICAL FIELD

Embodiments are generally related to the field of hunting tools. More particularly, embodiments relate to methods and systems for humanely dispatching game wounded in the field.

Embodiments are further related to tools for inserting or removing choke tubes.

Embodiments are also directed to tools for opening bottles.

Embodiments are further directed to tools for removing jammed cartridges from firearms.

Embodiments are thus directed to multifunction tools for dispatching wounded game, inserting or removing choke tubes, opening bottles, and removing jammed cartridges from firearms.

BACKGROUND OF THE INVENTION

It is common for a hunter's first attempt to bag game to result in the mortal wounding of the game without causing its immediate death. This is particularly true when hunting upland game, waterfowl, and other such game where a shotgun is the primary weapon. In such cases, the game is often struck by a sufficient number of pellets to ensure its ultimate demise. However, the bird is often wounded, but alive when the hunter arrives to retrieve the game. Thus, it would be advantageous and more humane to have a tool for quickly dispatching wounded game once it is retrieved.

Prior art methods for dispatching fowl are commonly centered on crushing the bird's head with a vice, pliers, or other such device. However, such devices are archaic, cause the wounded game unnecessary pain, can cause an unwanted mess, and can be difficult to carry in the field. Therefore, a need exists for a portable, humane, tool for dispatching fowl that can be easily taken into the field.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a tool.

It is another aspect of the disclosed embodiments to provide for an enhanced method, apparatus, and system for dispatching wounded game.

It is another aspect of the disclosed embodiments to provide an enhanced apparatus, method, and system for a portable tool for quickly and humanely dispatching wounded game in the field.

It is yet another aspect of the disclosed embodiment to provide a multi-purpose tool for removing and inserting choke tubes in a firearm.

It is another aspect of the disclosed embodiments to provide a portable tool for opening bottles.

It is another aspect of the disclosed embodiments to provide an apparatus, method, and system for a portable tool for removing jammed cartridges from a firearm.

It is an additional aspect of the disclosed embodiments to provide an enhanced apparatus, method, and system for a portable multifunctional tool for quickly and humanely dispatching wounded game in the field, removing and/or inserting choke tubes in firearms, opening bottles, and removing jammed cartridges from a firearm.

The aforementioned aspects and other objectives and advantages can now be achieved as described herein. An apparatus comprising a shank with a connecting end, a curved region, and a pointed end is connected to a grip formed at the connecting end of the shank. The grip can include a lip formed along the forward edge of the front side. The grip is connected to a finger ring. The apparatus, and specifically the curved region in the shank, is configured to allow the pointed end of the shank to penetrate a target below the targets skull and, upon continued insertion, penetrate the brain/brain stem of said target thereby humanely dispatching the target.

In other embodiments, the apparatus and system can include a choke wrench formed on the grip that provides a convenient means for removing and inserting choke tubes in a firearm.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
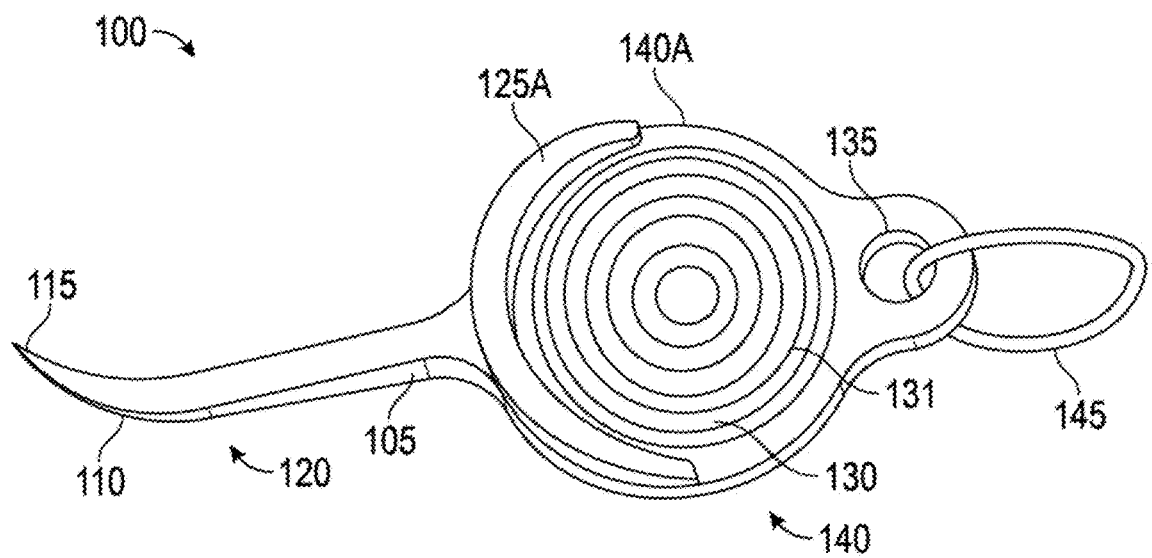
FIG. 1 depicts a tool for dispatching wounded game in the field.
Figure 1A:
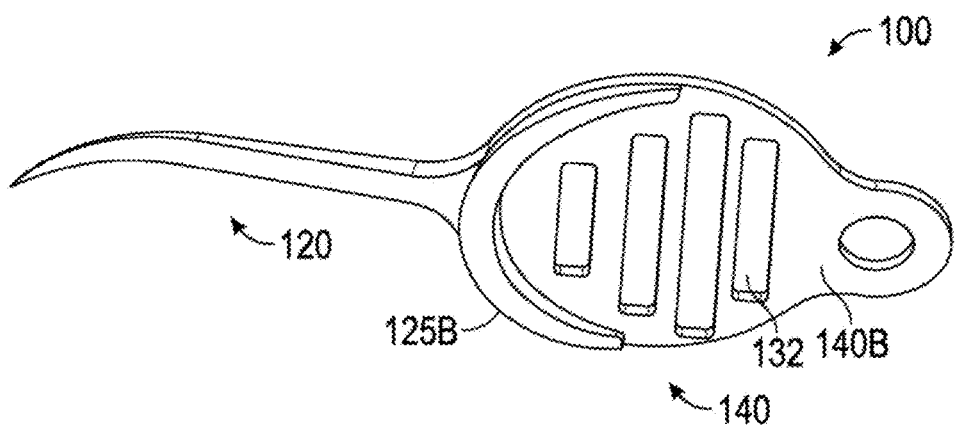
FIG. 1A depicts reverse side of tool for dispatching wounded game in the field.

FIG. 1 and FIG. 1A illustrate a portable tool 100 for humanely dispatching wounded game. Hunting enthusiasts commonly encounter a situation where a target is wounded. Such situations require the hunter to quickly dispatch the wounded game. However, traditionally, the game is killed manually or by using tools that crush the targets skull. These methods are unsatisfactory because they are often messy and cause significant damage to the animal's carcass. Such destruction is not desirable if the target is to be used, for example, in dog training where a headless body is not useful. Likewise, the hunter may wish to preserve the entire body in tact for various other reasons.

Tool 100 fills this need by providing a portable utility that can be carried into the field to quickly dispatch wounded game. Tool 100 includes a shank 120. Shank 120 is formed with a pointed end 115 that is configured to pierce the wounded game on the back of the head, just below the skull. Shank 120 includes a curved region 110 and a connecting end 105.

The curved region 110 of shank 120 is specifically configured so that after the pointed end 115 is inserted below the skull, the continued insertion of the shank 120 drives the pointed end 115 upward into the wounded game's brain and/or brain stem, thereby quickly and humanely dispatching the target. Thus, the angle of curved region 110 is critical. The angle of curved region 110 is preferably between 20 and 80 degrees, and may be selected to suit a specific target. For example, a more dramatic angle may be required for game with a larger head, longer neck, or other such anatomical feature. The angle of curved region 110 can therefore be selected to match the anatomy of the game the hunter is hunting.

Shank 120 can be formed with a tapered rectangular shape. Shank 120 is tapered so that pointed end 115 terminates in a sharp point. Alternatively, shank 120 can be formed with a tapered tubular shape shown in FIGS. 3A-3G below.

Figure 2:
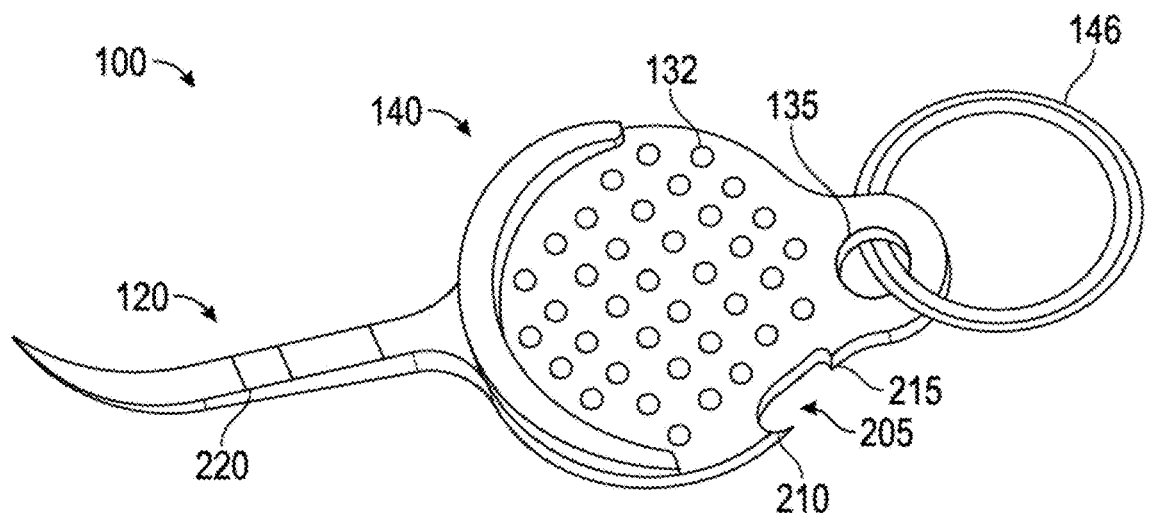
FIG. 2 depicts an alternative embodiment of an apparatus and system for dispatching wounded game in the field.

In a preferred embodiment, shank 120 is formed from a plastic polymer, wood, aluminum, or other metal, or a combination thereof. It should be appreciated that the tool can be used in conjunction with game fowl, dove, quail, ducks, geese, snipe, pigeon, chickens, turkey, fish, and other species of game. In addition, the length of the shank and the size of the grip may be altered to fit the specific anatomy of the game upon which the tool is intended to be used. This may include providing markings on a "one size fits all" version of the shank 120 that indicates to the user roughly how deep the shank 120 needs to be inserted in order to effectively reach the brain/brain stem of a variety of different game animals. Such markings are shown in FIG. 2 as markings 220. Markings 220 can be color coded and/or labeled to identify the game species the mark is associated with. This provides the user a metric for how deep the tool should be inserted for that species.

Connecting end 105 of the shank 120 is connected to grip 140. Grip 140 is intended to be grasped between the thumb and index fingers. Grip 140 includes a front surface 140A and rear surface 140B (shown in FIG. 1A of the reverse side of tool 100). The front side of front surface 140A includes a lip 125A and the front side of rear surface 140B includes lip 125B. Lips 125A and 125B prevent the user's fingers from slipping off the grip 140. Grip 140 also includes a hole 135 formed to accept a retaining device 145, such as a lanyard or key chain ring. This allows a user to easily connect tool 100 to a belt, boot, gun, backpack, or other clothing article via the retaining device 145 so that the tool 100 can be easily carried into the field. In an alternative embodiment, retaining device 145 can have an elastic property or otherwise be configured with a retractable cord so that the tool 100 can be pulled away from the user for use in the field without being removed from its connection to the user when it is used.

Grip 140 can be comprised of a sub-structure such as a plastic polymer, wood, metal such as aluminum, or the like, with a rubber coating 130 formed over the sub-structure. The grip 140 can include a plurality of ridges comprising parallel raised ridges 132, parallel sunken ridges, concentrically raised rings 131, dimples, or the like to promote a user's grip and prevent slippage. It should be appreciated that any combination of ridges, rings, dimples, or the like can be included on the front surface 140A and/or rear surface 140B, so as to best facilitate the user's grip.

FIG. 2 illustrates an alternative embodiment, of tool 100. It should be noted that equivalent or similar features throughout the figures are labeled with the same reference numerals. In the preferred embodiment illustrated in FIG. 2, tool 100 includes a plurality of raised dimples 132 to prevent a user's fingers from slipping off of grip 140. Furthermore, in an alternative embodiment, grip 140 can further include a bottle opener, which comprises a cutout 205 in the back of grip 140 with a flat side 215 and a lip 210. FIG. 2 also illustrates a further alternative embodiment wherein a key ring 146 is connected to hole 135 of the tool 100.

Figure 3A:
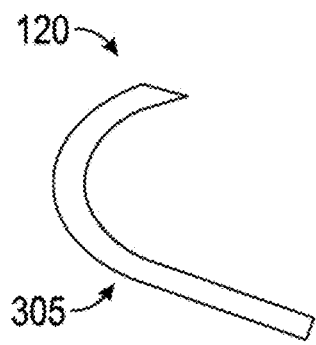
FIG. 3A depicts an exploded view of a pointed end comprising a hook associated with a tool for dispatching wounded game in the field in accordance with an alternative embodiment.
Figure 3B:
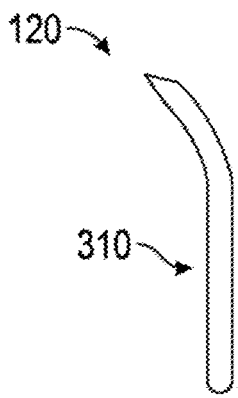
FIG. 3B depicts an exploded view of a pointed end comprising a left twist associated with a tool for dispatching wounded game in the field in accordance with an alternative embodiment.
Figure 3C:
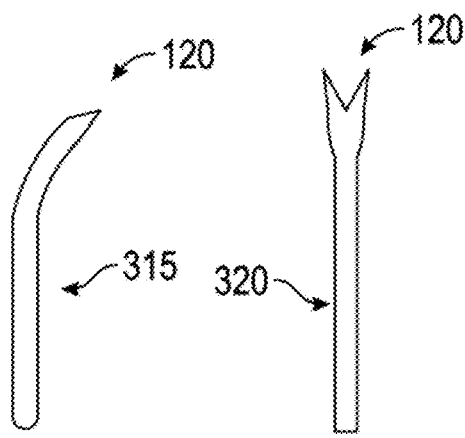
FIG. 3C depicts an exploded view of a pointed end comprising a right twist associated with a tool for dispatching wounded game in the field in accordance with an alternative embodiment.
Figure 3D:
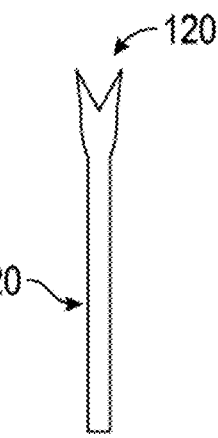
FIG. 3D depicts an exploded view of a pointed end comprising a split-v tip, associated with a tool for dispatching wounded game in the field in accordance with an alternative embodiment.
Figure 3E:
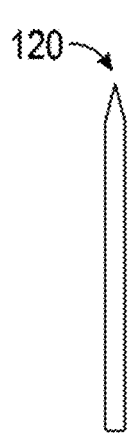
FIG. 3E depicts an exploded view of a pointed end comprising a straight tip associated with a tool for dispatching wounded game in the field in accordance with an alternative embodiment.
Figure 3F:
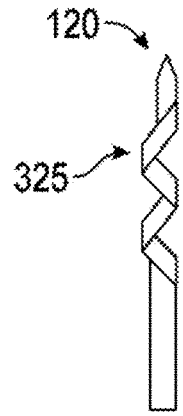
FIG. 3F depicts an exploded view of a pointed end comprising a spiral tip associated with a tool for dispatching wounded game in the field in accordance with an alternative embodiment.
Figure 3G:
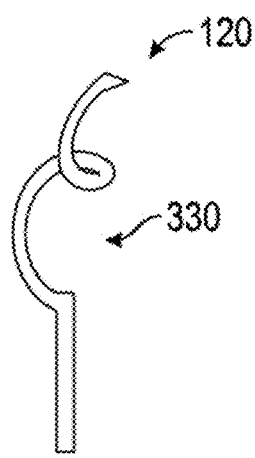
FIG. 3G depicts an exploded view of a pointed end comprising a loose corkscrew tip associated with a tool for dispatching wounded game in the field in accordance with an alternative embodiment.

FIGS. 3A-3G illustrate a set of shanks 120 each of which can be used in accordance with an alternative embodiment of the invention. For example, FIG. 3A illustrates a hook curved region 305 of a shank 120. Likewise, FIG. 3B shows a left twisted curved region 310 of a shank 120. FIG. 3C shows a right twisted curved region 315 of shank 120. FIG. 3D illustrates an alternative embodiment wherein shank 120 includes a v-split pointed end 320. The v-split illustrated in FIG. 3D may be sharp so that as the v-split point end 320 encounters obstructions within the target, it is capable of cutting or severing such obstructions (such as, for example, the target's brain or brainstem, spinal cord, etc.) further aiding in the humane and immediate death of the target. FIG. 3E illustrates a straight shank 120. FIG. 3F displays a spiraled region 325 of shank 120. It should he appreciated with respect to spiraled region 325 that this spiral could be advantageously included in a curved shank such as curved region 110 as shown in FIG. 1. Finally, FIG. 3G illustrates a loose corkscrew region 330 of a shank 120.

It should be appreciated that while FIGS. 3A-3G illustrate a shank embodied as tubular and/or tapered, such shanks could further be configured with a tapered and/or rectangular shaped shank, as shown in FIG. 1. Furthermore, each of FIGS. 3A-3G could alternatively be used as shank 120.

Figure 4:
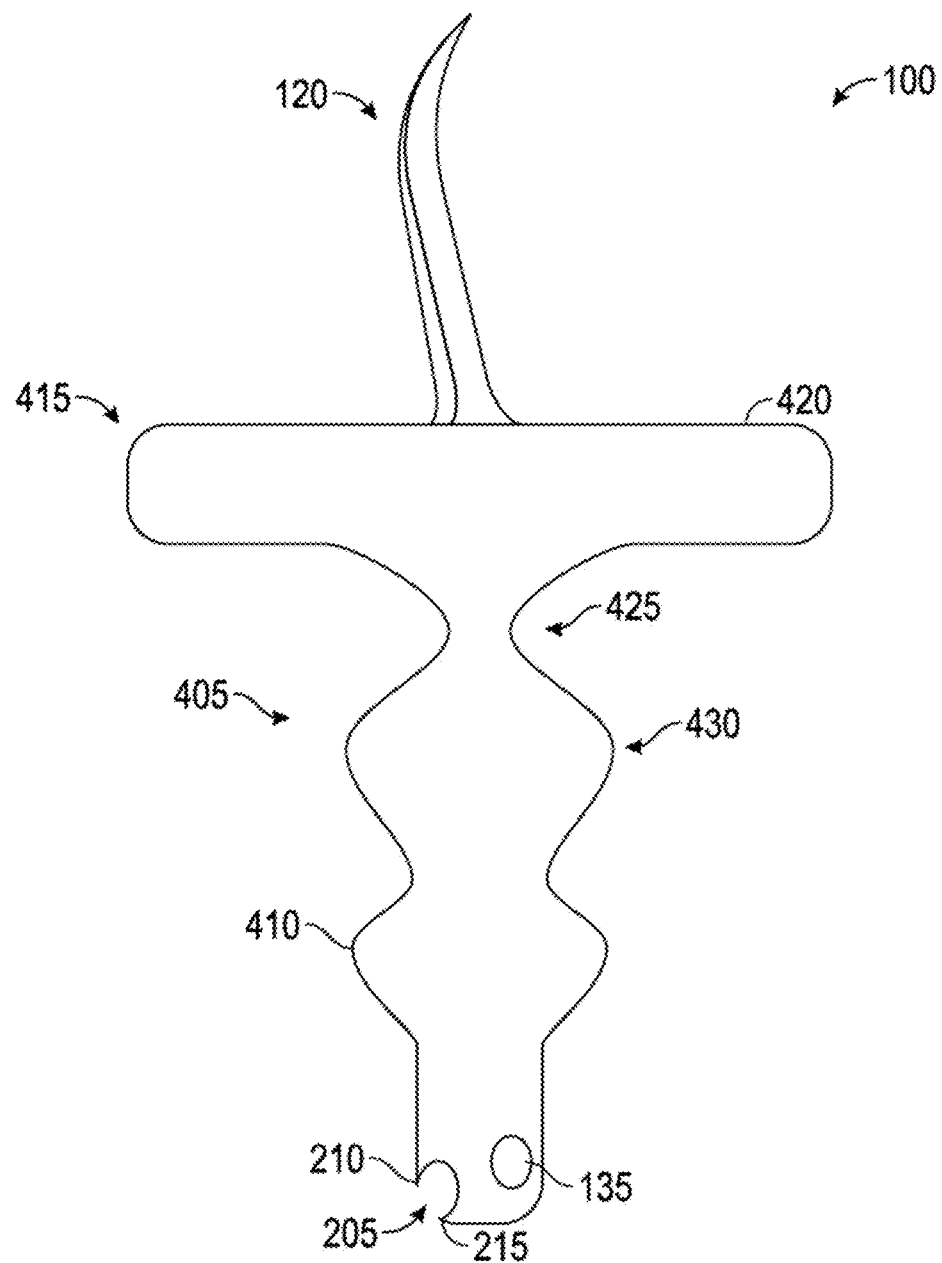
FIG. 4 depicts an exploded view of an alternative grip associated with a tool for dispatching wounded game in the field in accordance with an alternative embodiment.

FIG. 4 illustrates an alternative embodiment of the tool 100. In this embodiment, grip 140 is replaced with a handle 405. Handle 405 is included to be grasped by a wrapping ones fingers around finger grip region 410. Grip 140 includes a finger guard 415, comprising a lateral member 420 affixed to shank 120 such that the lateral member shields the user's fingers and hand from the target.

Finger grip region 410 is configured to fit users' fingers with a series of indentions 425 and protrusions 430 intended to provide the user a comfortable and ergonomic grip of handle 405.

It should be appreciated that tool 100 illustrated in FIG. 4 could be advantageously arranged with any of the shanks 120 illustrated in FIGS. 3A-3G. Furthermore, handle 405 shown in FIG. 4 can include a hole 135 formed to accept a retaining device such as retaining device 145 shown in FIG. 1. This allows a user to easily connect tool 100 to a belt, boot, gun, backpack, or other clothing article via the retaining device 145 so that the tool 100 can be easily carried into the field.

Handle 405 can be comprised of a sub-structure such as a plastic polymer, metal, or the like with a rubber coating, such as coating 130 shown in FIG. 1, formed over the sub-structure. The grip 140 can include a plurality of ridges, dimples, or the like to promote a user's grip and prevent slippage. Furthermore, in an alternative embodiment, handle 405 can include a bottle opener which comprises a cutout 205 at the end of handle 405 with a flat side 215 and a lip 210.

Figure 5:
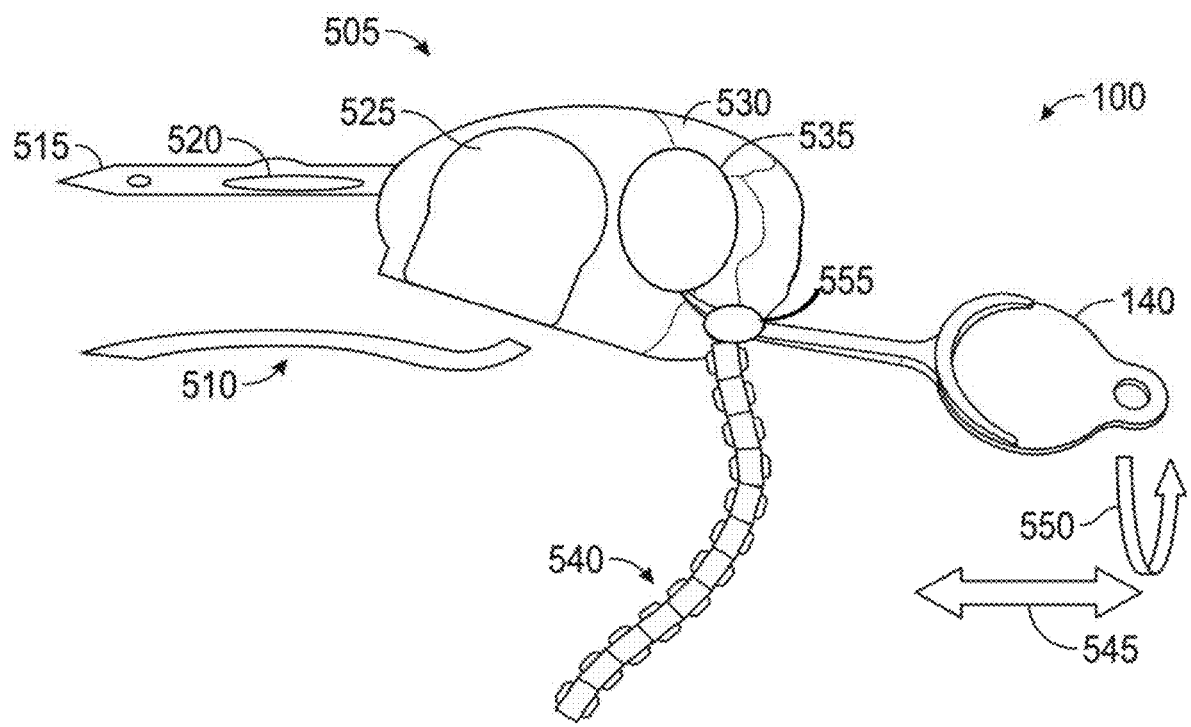
FIG. 5 depicts a tool being used to dispatch wounded game in the field in accordance with an alternative embodiment.

FIG. 5 illustrates the tool 100 inserted in the brain and/or brain stem 535 of a target 505 in accordance with another alternative embodiment. FIG. 5 illustrates an embodiment wherein tool 100 is being used to humanly dispatch game fowl. However, it should be appreciated that tool 100 may also be used to dispatch a target including a large variety of game including small mammals, fish, amphibians, and birds. In general, target 505 may have an anatomy comprising an upper beak 515, lower beak 510, nasal orifice 520, orbital region 525, brain case 530, brain/brainstem 535, and vertebrae 540.

Generally, grip 140 of tool 100 can be maneuvered laterally as shown by arrow 545. Maneuvering grip 140 causes shank 120 to enter the target below the skull at 555 and then penetrate the target's brain/brainstem 535 with pointed end 115. It should be appreciated that the curved region 110 of tool 100 allows the lateral movement of the grip 140 to impart a lateral movement in shank 120 that is translated into an upward motion of pointed end 115, thus penetrating the brain/brain stem from below, without requiring the targets head to be crushed. Once pointed end 115 penetrates the target's brain 535, the target is quickly and humanely dispatched.

Grip 140 and tool 100 can also be moved rotationally as shown by arrow 550, during or after the tool 100 has been inserted into the target. Rotational motion 550 can help incur catastrophic damage to the targets brain/brainstem 535 to ensure the target is swiftly and humanely dispatched.

Figure 6:
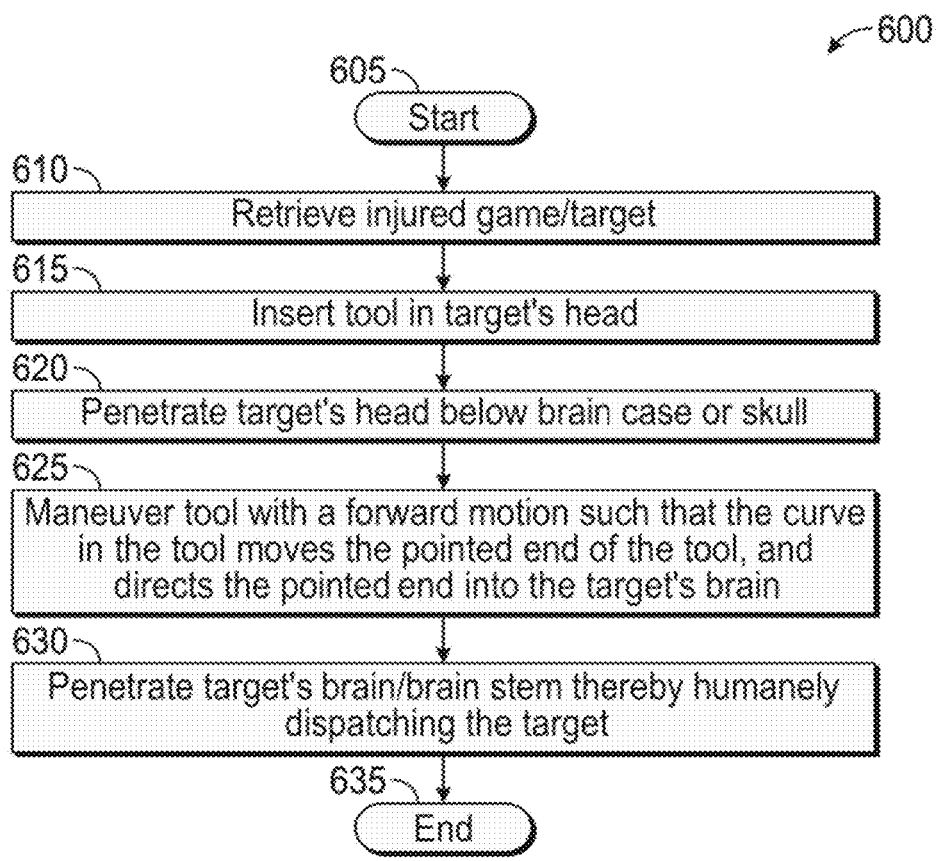
FIG. 6 depicts a flow chart depicting logical operational steps associated with a method of dispatching wounded game in the field in accordance with an alternative embodiment.

FIG. 6 illustrates a set of logical operational steps 600 for quickly and humanly dispatching game in the filed using a tool such as tool 100 shown above. The method starts at step 605.

At step 610, the hunter retrieves game that has been wounded in the field. The tool 100 is then inserted into the wounded game, preferably in the back of the target's head as in step 615, and below the target's brain case as illustrated at step 620. Next, the user laterally maneuvers the tool 100 such that the curved region of the shank directs the pointed end of the shank into the targets brain or brain stem, as described at step 625. Finally at step 630, the target's brain is penetrated and the wounded game is therefore quickly and humanely dispatched. The method ends at step 635.

Figure 7:
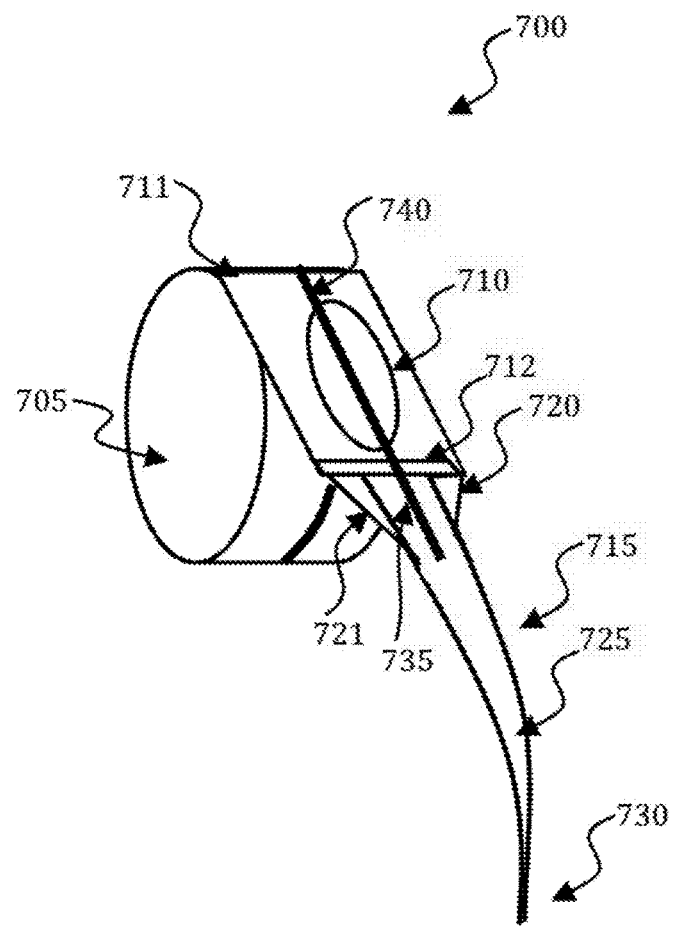
FIG. 7 depicts an embodiment of a tool dispatching wounded game in the field in accordance with an alternative embodiment.

FIG. 7 illustrates an embodiment of a portable tool 700 for humanely dispatching wounded game. Tool 700 provides a portable utility that can be carried into the field to quickly dispatch wounded game. Tool 700 includes a shank 715. Shank 715 is formed with a pointed end 730 that is configured to pierce the wounded game on the back of the head, just below the skull as illustrated in FIG. 5. Shank 715 includes a curved region 725 and a connecting end 735.

It should be appreciated that the configuration of the shank 715 can include an upward curve, downward curve, left curve, right curve, no curve, and/or any of the alternative configurations of the curved region 725 illustrated in FIGS. 3A-3G.

The curved region 725 of shank 715 is specifically configured so that after the pointed end 730 is inserted below the skull, the continued insertion of the shank 715 drives the pointed end 730 upward into the wounded game's brain and/or brain stem, thereby quickly and humanely dispatching the target. Thus, the angle of curved region 725 is critical. The angle of curved region 725 is preferably between 20 and 80 degrees (although other angles are possible, e.g., no angle), and may be selected to suit a specific target. For example, a more dramatic angle may be required for game with a larger head, longer neck, or other such anatomical feature. The angle of curved region 725 can therefore be selected to match the anatomy of the game.

Shank 715 can be formed with a tapered rectangular shape. Shank 715 is tapered so that pointed end 730 terminates in a sharp point. Alternatively, shank 715 can be formed with a tapered tubular shape or according to any of the shapes shown in FIGS. 3A-3G. In certain embodiments, the shank 715 can include support strut 720 and support strut 721 formed on or near the connecting end 735 of the shank. The support struts 720 and 721 can run along the side of, and connect to, the connecting end 735 of shank 715 and connect to grip 710. The support struts 720 and 721 are configured to strengthen the connecting end 735 of the shank 715 where the shank 715 experiences significant strain. In addition, a central thickened support 740 can be provided that further structurally supports grip 710, finger loop 705, and shank 715. In certain embodiments, shank 715 can be substantially tubular with the tubular structure of the shank 715 extending through the grip 710 and finger loop 705 serving as thickened support 740.

In a preferred embodiment, shank 715 is formed from a plastic, polymer, wood, aluminum, copper, zinc, steal, or other metal, or a combination thereof. Support struts 720 and 721 can be formed of similar materials. It should be appreciated that the tool can be used in conjunction with game fowl, dove, quail, ducks, geese, snipe, pigeon, chickens, turkey, grouse, crane, pheasant, fish, and other species of game. In addition, the length of the shank and the size of the grip may be altered to fit the specific anatomy of the game upon which the tool 700 is intended to be used. This may include providing markings on a "one size fits all" version of the shank 715 that indicates to the user roughly how deep the shank 715 needs to be inserted in order to effectively reach the brain/brain stem of a variety of different game animals. Such markings are shown in FIG. 2 as markings 220. Markings 220 can be color coded and/or labeled to identify the game species the mark is associated with. This provides the user a metric for how deep the tool should be inserted for that species.

Connecting end 735 of the shank 715 is connected to grip 710. Grip 710 is generally intended to he grasped by the thumb, although it could be grasped by other fingers in other embodiments. Grip 710 includes a front surface 711. The front side of front surface 711 can include a lip 712. Lip 712 prevents the user's thumb from slipping off the grip 710. Grip 710 also includes a hole formed to accept a retaining device 145, such as a lanyard or key chain ring. This allows a user to easily connect tool 700 to a belt, boot, gun, backpack, or other clothing article via the retaining device 145 so that the tool 700 can be easily carried into the field. In an alternative embodiment, retaining device 145 can have an elastic property or otherwise be configured with a retractable cord so that the tool 700 can be pulled away from the user for use in the field without being removed from its connection to the user when it is used.

Grip 710 can be comprised of a sub-structure such as a plastic polymer wood, metal such as aluminum, copper, zinc, steal, other metals, or the like with a rubber coating formed over the sub-structure. In other embodiments, no coating is provided over the sub-structure. The grip 710 can include a plurality of ridges, dimples, or the like as illustrated in FIGS. 1-2 to promote a user's grip and prevent slippage. The ridges or dimples can be configured to model certain natural shapes such as a feather. It should be appreciated that any combination of ridges, rings, dimples, or the like can be included on the front surface 711 so as to best facilitate the user's grip.

Grip 710 can be connected to the top of finger loop 705. Finger loop 705 comprises a hollow ring structure. The top of the finger loop 705 can be connected to the bottom of grip 710. Alternatively, finger loop 705 and grip 710 can comprise a single curled structure, wherein a strip of material (most commonly metal, but other material could be used) is wrapped to form the finger loop 705 with a remaining portion of the material formed along the top of the finger loop 705 to form the grip 710.

In practice, a user would preferably insert a finger through the finger loop 705 while holding the grip 710 with a thumb. In some cases, the preferable finger for insertion through the finger loop 705 is a pointer finger. In other embodiments, other fingers including the middle, ring, pinky, or thumb could be inserted through the finger loop 705, leaving the remaining finger to brace against the front of finger loop 705 and the underside of grip 710.

Figure 8:
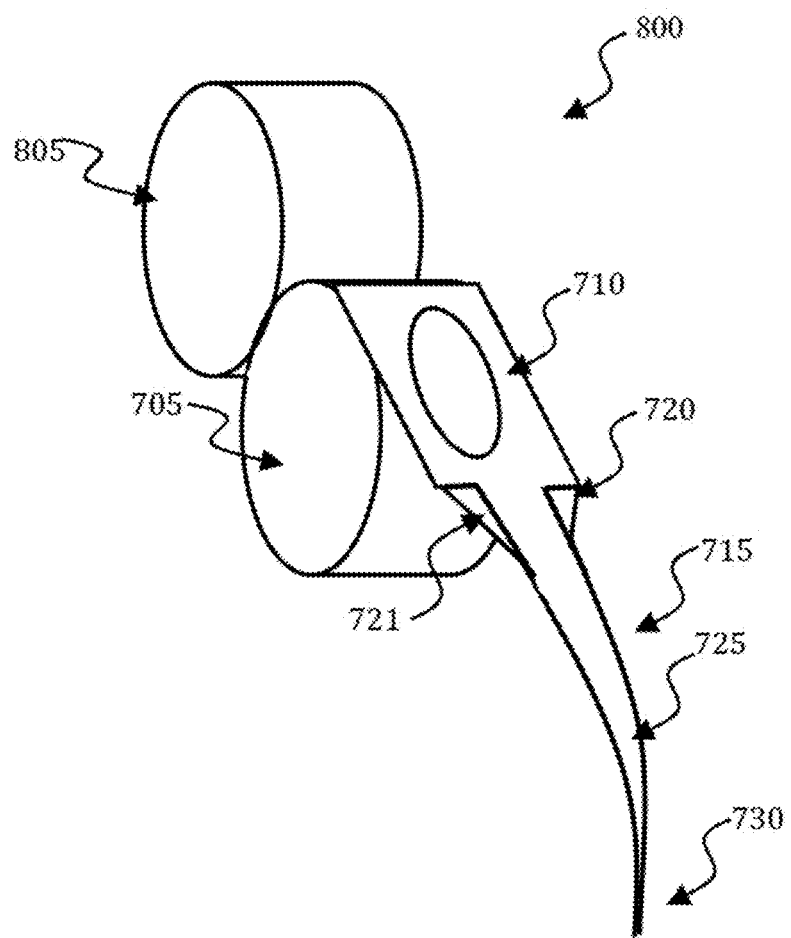
FIG. 8 depicts another embodiment of a tool for dispatching wounded game in the field in accordance with an alternative embodiment.

FIG. 8 illustrates an alternative embodiment of tool 800. It should be noted that equivalent or similar features throughout the figures are labeled with the same reference numerals. In the embodiment illustrated in FIG. 8, tool 800 includes a second finger loop 805. Second finger loop 805 can serve as a finger loop for insertion of an additional finger. Second finger loop 805 is illustrated as connected to the back of finger loop 705. However, it should be understood that the orientation of second finger loop 805, with respect to finger loop 705, could be adjusted to be at any location on the finger loop 705, for example, directly below finger loop 705 or slightly below the center of finger loop 705, according to design considerations.

Alternatively or additionally, second finger loop 805 can provide a loop for connecting a retaining device 145, such as a lanyard or key chain ring. It should be understood that additional finger loops can be included in other embodiments, wherein up to six loops could be provided.

Figure 9:
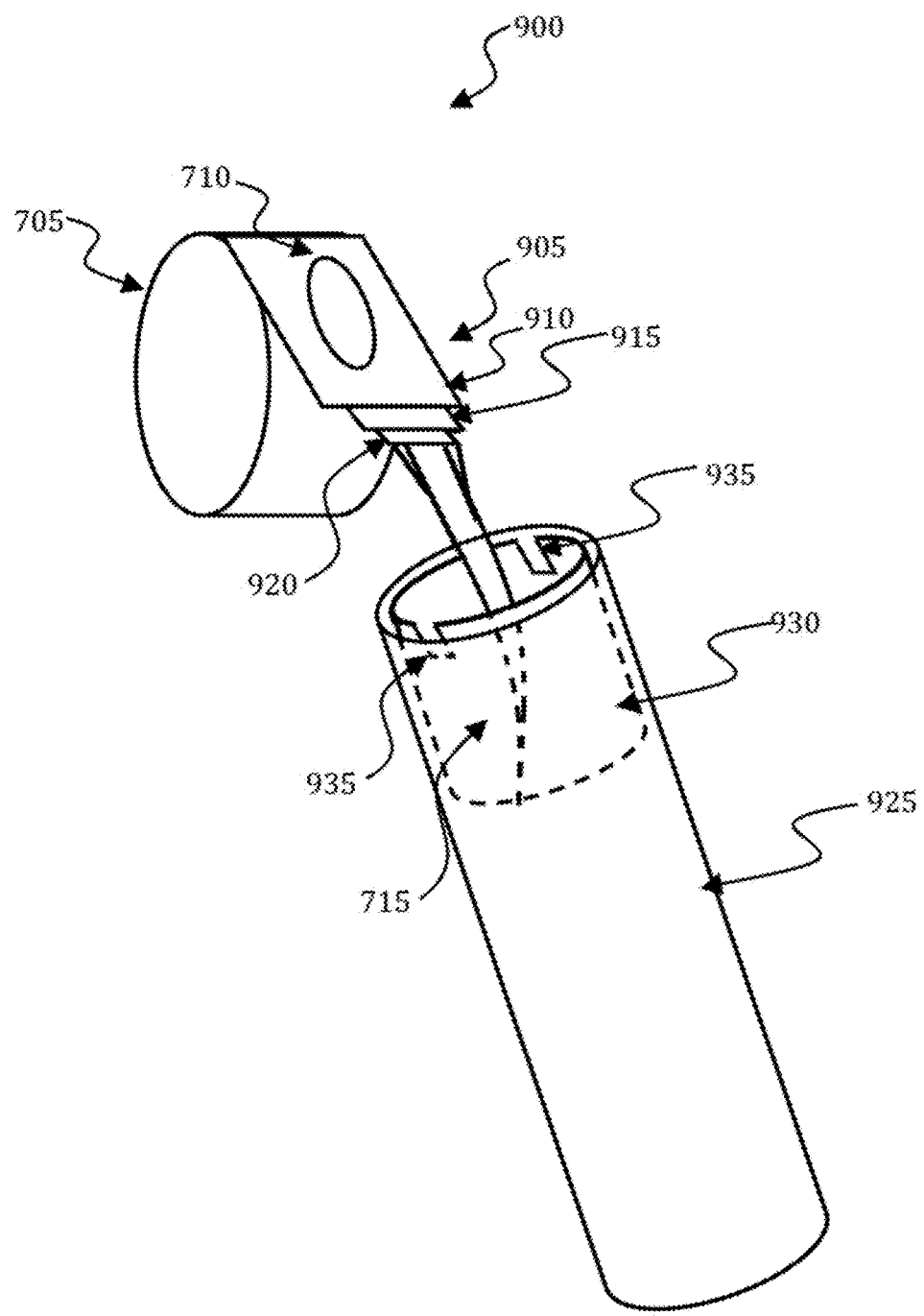
FIG. 9 depicts an embodiment of a tool for removing and/or inserting a choke tube in a gun.

FIG. 9 illustrates another embodiment of a tool 900. Tool 900 generally comprises a shank 715, grip 710, and finger loop 705 as with tool 700. However, tool 900 further comprises a choke wrench 905. Choke wrench 905 can comprise a series of choke wrench steps 910, 915, and 920 formed in the front end of grip 710.

Shotguns barrels, such as barrel 925, are often configured with a choke tube 930. The choke tube 930 is generally threaded into the end of the barrel 925 and controls the spread characteristics of a shot exiting the barrel 925. Different choke tubes 930 can be exchanged and inserted into the barrel to modify the shot spread characteristics. Choke tubes, such as choke tube 930, generally include slots 935 where a tool 900 can be used to insert or remove the choke tube 930.

Shotgun barrels, such as barrel 925, generally come in a variety of diameters. The diameter across the opening in the barrel is known as the gauge. Typical shotguns come in 10 gauge, 12 gauge, 20 gauge, and "410" sizes. A variety of less common gauges also exist.

Choke wrench steps 910, 915, and 920 are configured to interface with slots 935 in order to facilitate the threading or unthreading of the choke tube 930. Each of choke step 910, choke step 915, and choke step 920 are sized to engage with a specific shotgun gauge. For example, in one embodiment, choke step 910 is sized to fit a 12 gauge shotgun choke tube 930, choke step 915 is sized to fit a 20 gauge shotgun choke tube 930, and choke step 920 is sized to fit a 410 gauge shotgun choke tube 930. It should be appreciated that additional or alternative choke steps can be included in tool 900 to fit other shotgun gauges in other embodiments. In some cases, seven or more choke steps can be provided.

It is further noteworthy that often choke tubes, such as choke tube 930, come in a variety of styles, most importantly with different sized slots 935. The size of slots 935 can also vary according to shotgun brand. In particular, the depth and width of the slots 935 may vary. Thus, in other embodiments, the thickness and depth of choke step 910, choke step 915, and choke step 920 can be matched to fit a specific slot 935 size according to design considerations.

In still other embodiments, the choke steps can be incorporated into the natural shape of the grip 710 and finger loop 705. For example, in an exemplary embodiment, the grip 710 and finger loop 705 can be configured to look like a curled feather with the shank 715 configured to look like the quill of the feather. In such embodiments, the successive barbs in the feather vein nearest the shank 715 can comprise the choke steps 910, 915, and 920.

Figure 10A:
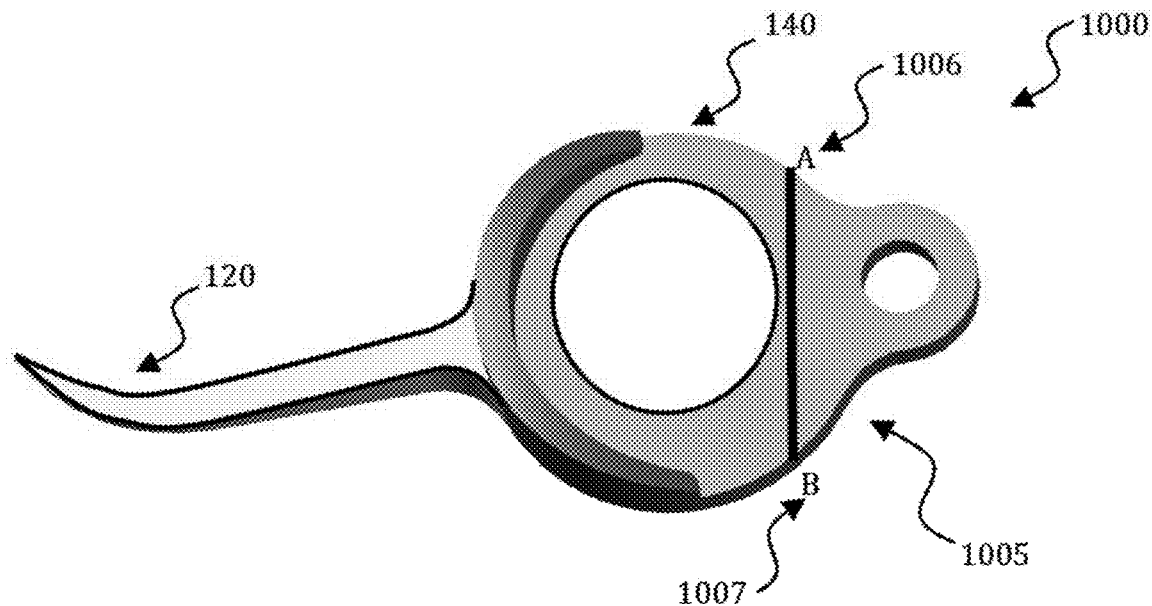
FIG. 10A depicts another embodiment of a tool for removing and/or inserting a choke tube in a gun.
Figure 11:
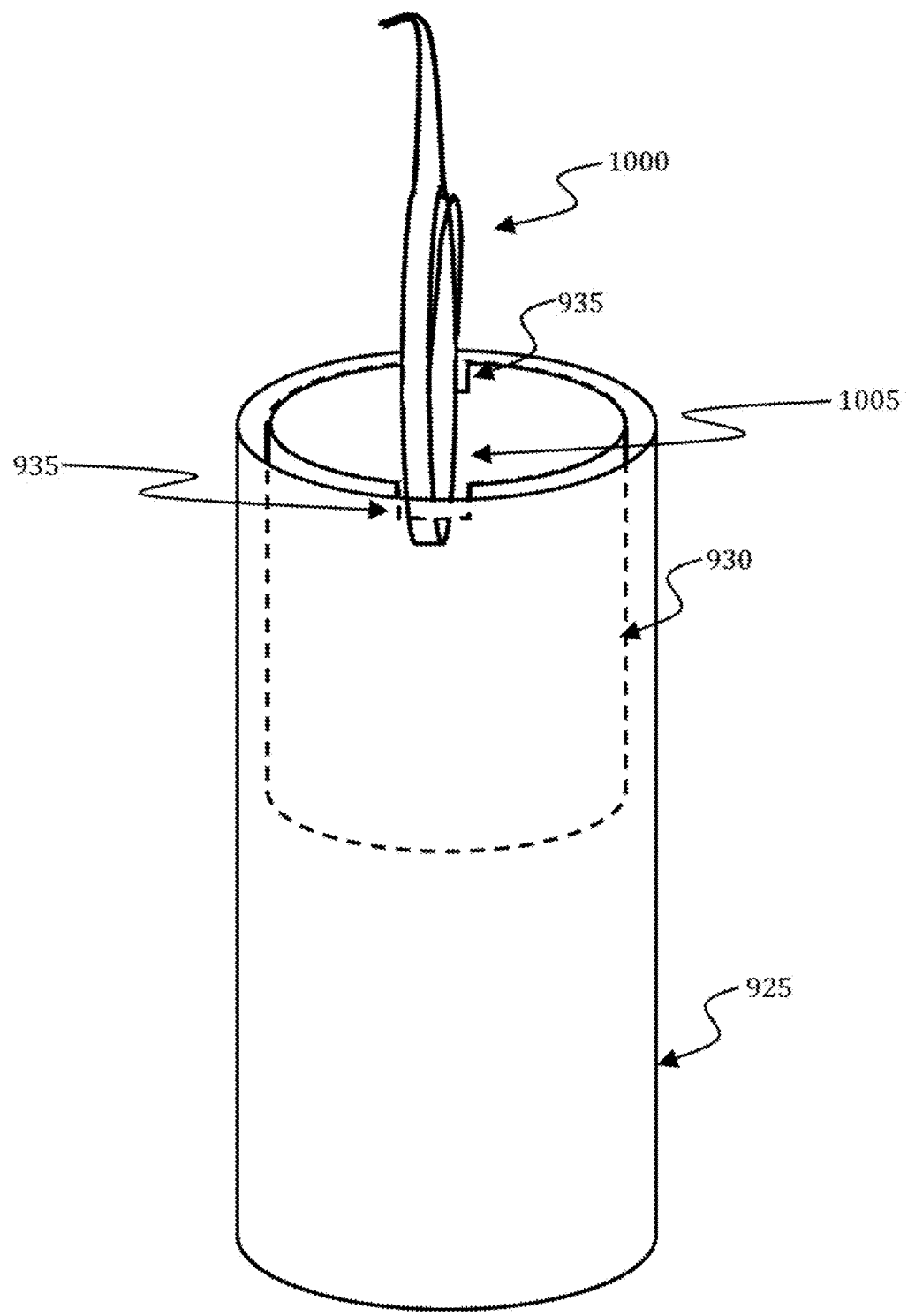
FIG. 11 depicts the use of tool for removing and/or inserting a choke tube in a gun in accordance with the disclosed embodiments.

FIG. 10A illustrates an embodiment of a tool 1000. As with tool 100 shown in FIG. 1, tool 1000 includes a shank 120 and grip 140, with associated configurations as described above with respect to FIGS. 1 and 1A. However, tool 1000 further includes a choke wrench 1005. In this embodiment, the grip 140 is configured with a rounded edge such that the distance between two points along the edge, for example, point A 1006 and point B 1007, matches the distance between slots 935 on a choke tube 930. This is illustrated in FIG. 11, where the tool 1000 is illustrated in use to remove a choke tube 930. Choke wrench 1005 is engaged with choke tube 930 via slots 935.

As discussed above, choke tubes come in a variety of gauges. The curvature of the grip edge, for example, between point A 1006 and point B 1007, and/or a plurality of other sets of points along the grip edge, can be configured to specifically provide the proper distances for any of the possible of gauges. Thus, the choke wrench can be used to insert or remove choke tubes of any gauge.

Figure 10B:
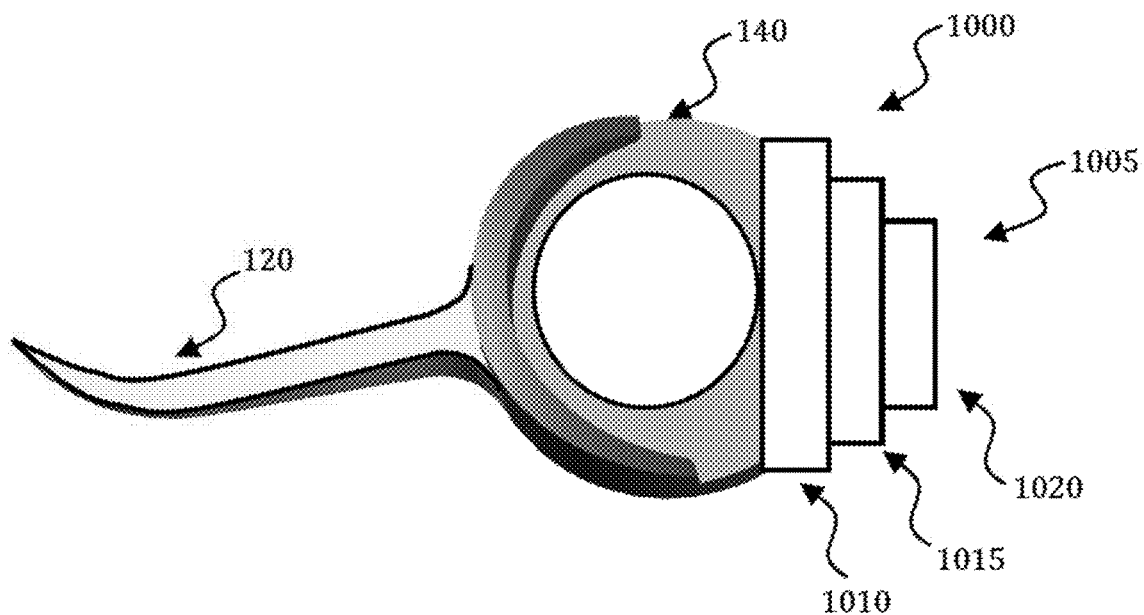
FIG. 10B depicts another embodiment of a tool for removing and/or inserting a choke tube in a gun.

FIG. 10B illustrates another embodiment of tool 1000. In this embodiment, the back end of the grip 140 is configured into a choke wrench 1005 with a series of choke steps; namely choke step 1010, choke step 1015, and choke step 1020. Choke steps 1010, 1015, and 1020 are configured to interface with slots 935 in order to facilitate the threading or unthreading of the choke tube 930. Each of choke step 1010, choke step 1015, and choke step 1020 are sized to engage with a specific shotgun gauge. For example, in one embodiment, choke step 1010 is sized to fit a 12 gauge shotgun choke tube 930, choke step 1015 is sized to fit a 20 gauge shotgun choke tube 930, and choke step 1020 is sized to fit a 410 gauge shotgun choke tube 930. It should be appreciated that additional or alternative choke steps can be included in tool 1000 to fit other shotgun gauges in other embodiments. In some cases, seven or more choke steps can be provided.

Furthermore, choke tubes, such as choke tube 930, come in a variety of styles, most notably with different sized slots 935. The size of slots 935 can also vary according to the shotgun brand. Thus, in other embodiments of tool 1000, the thickness of the grip edge and/or the thickness and depth of the choke step 1010, choke step 1015, and choke step 1020 can be matched to fit a specific slot 935 size according to design considerations.

In another embodiment, the shank 715 of tool 700, tool 800, and/or tool 900 can be used to extract jammed shells from the magazine, receiver, or chamber of a shotgun. In yet another embodiment, the shank 120 of tool 100 or tool 1000 can be used to extract jammed shells from the magazine, receiver, or chamber of a shotgun.

Figure 12:
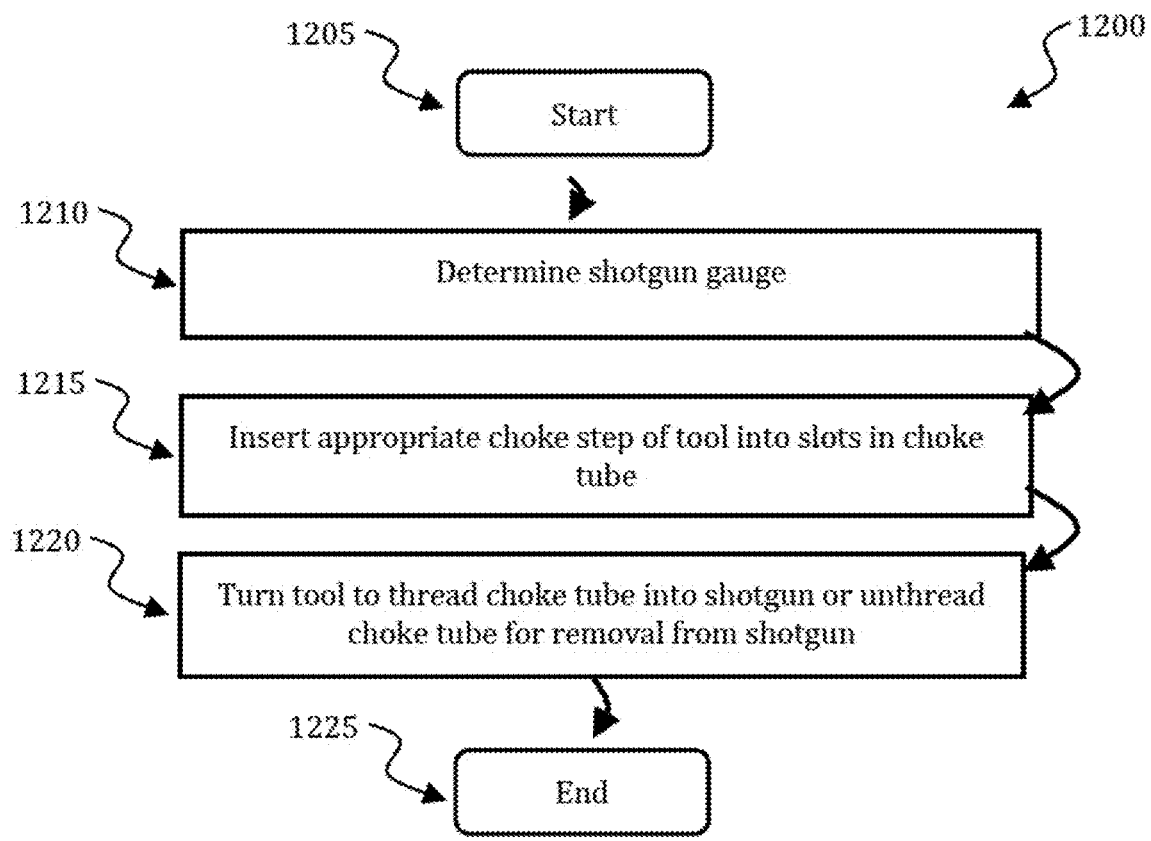
FIG. 12 depicts a flow chart depicting steps associated with a method of removing a choke tube from a gun in accordance with an embodiment.

FIG. 12 illustrates a method 1200 for installing or removing a choke tube in accordance with the embodiments disclosed herein. The method starts at step 1205. At step 1210, the correct gauge of the gun and/or choke tube can be determined. Next at step 1215, the choke wrench associated with the tool can be inserted into the slots in the choke tube. It should be appreciated that the appropriate choke step or width of the choke wrench should be selected to properly fit in the slots of the choke wrench. The tool is then turned in order to thread the choke tube into the firearm or unthread the choke tube out of the firearm as shown at step 1220. The choke tube has thus been properly installed or removed. The method ends at step 1225.

Based on the foregoing, it can be appreciated that a number of embodiments, preferred and alternative, are disclosed herein. For example, in one embodiment, an apparatus comprises a shank comprising a connecting end and a pointed end adapted to penetrate a cranial cavity, a grip formed on the connecting end of the shank, and at least one finger loop connected to the grip. In an embodiment, the at least one finger loop further comprises two finger loops.

In an embodiment, the apparatus further comprises at least one support strut formed between the connecting end of the shank and the grip.

In an embodiment, the apparatus further comprises a choke wrench formed at an, end of the grip. In another embodiment, the choke wrench comprises at least one choke step configured to interface with slots formed in a choke tube.

In an embodiment, the apparatus further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target. In an embodiment, the pointed end further comprises one of a left twist, a right twist, a loose corkscrew tip, a hook tip, a straight tip, a spiral tip, and a split-v tip.

In another embodiment, a system comprises a shank comprising a connecting end and a pointed end adapted to penetrate a cranial cavity, a grip formed on the connecting end of the shank, and at least one finger loop connected to the grip. In an embodiment, the at least one finger loop further comprises two finger loops. In an embodiment, the system further comprises at least one support strut formed between the connecting end of the shank and the grip.

In an embodiment, the system further comprises a choke wrench formed at an end of the grip. In an embodiment, the choke wrench comprises at least one choke step configured to interface with slots formed in a choke tube.

In an embodiment, the system further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target. In an embodiment, the pointed end further comprises one of a left twist, a right twist, a loose corkscrew tip, a hook tip, a straight tip, a spiral tip, and a split-v tip.

In yet another embodiment, an apparatus comprises a shank comprising a connecting end and a pointed end, a grip formed at the connecting end of the shank comprising a front surface and a rear surface, and a choke wrench formed along an edge of the grip.

In an embodiment, the choke wrench further comprises a curvature formed in the trailing edge of the grip. In another embodiment, the choke wrench further comprises at least one choke step formed in a rear end of the grip.

In an embodiment, the grip further comprises a sub-structure formed to connect to the connecting end of the shank. The sub-structure further comprises a cutout region comprising a flat wall and a lip formed on a side of the grip configured to open a bottle.

In another embodiment, the apparatus further comprises a curved region in the shank wherein the curved region in the shank is configured to allow the pointed end of the shank to penetrate a target below the target's cranial cavity and, upon continued insertion, penetrate a brain in the cranial cavity of the target thereby humanely dispatching the target.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An apparatus comprising:
   a shank comprising a connecting end and a pointed end;
   a finger grip formed at said connecting end of said shank, said finger grip comprising a front surface and a rear surface; and
   a choke wrench formed along an edge of said finger grip said choke wrench comprising at least two choke steps wherein each of said at least two choke steps is sized to engage with a shotgun choke.

2. The apparatus of claim 1 wherein said choke wrench is formed on an opposing edge of said finger grip in relation to said connecting end of said shank.

3. The apparatus of claim 1 wherein a first choke step of said choke wrench further comprises a 12 gauge shotgun choke wrench, and a second choke step of said choke wrench further comprises a 20 gauge shotgun choke wrench.

4. The apparatus of claim 1 wherein said grip further comprises:
   a sub-structure formed to connect to said connecting end of said shank.

5. The apparatus of claim 4 wherein said sub-structure further comprises:
   a cutout region comprising a flat wall and a lip formed on a side of said grip configured to open a bottle.

6. The apparatus of claim 1 further comprising:
   a curved region in said shank wherein said curved region in said shank is configured to allow said pointed end of said shank to penetrate a target below said target's cranial cavity and, upon continued insertion, penetrate a brain in said cranial cavity of said target thereby humanely dispatching said target.

* * * * *